United States Patent
Sherrod

(10) Patent No.: US 7,766,116 B1
(45) Date of Patent: Aug. 3, 2010

(54) VEHICLE WITH OPTIMIZED ON-DEMAND FRONT DRIVE SYSTEM

(75) Inventor: Sean Sherrod, Wyoming, MN (US)

(73) Assignee: Polaris Industries Inc., Medina, MN (US)

( * ) Notice: Subject to any disclaimer, the term of this patent is extended or adjusted under 35 U.S.C. 154(b) by 672 days.

(21) Appl. No.: 11/014,616

(22) Filed: Dec. 16, 2004

(51) Int. Cl.
*B60K 17/348* (2006.01)
*B60K 17/354* (2006.01)

(52) U.S. Cl. .................................. 180/245; 180/248

(58) Field of Classification Search ............... 180/245, 180/197, 244, 246, 248, 249
See application file for complete search history.

(56) References Cited

U.S. PATENT DOCUMENTS

| | | | |
|---|---|---|---|
| 3,194,369 A | 7/1965 | Witte | 192/54.1 |
| 3,295,625 A | 1/1967 | Ordorica et al | 180/44 |
| 3,732,752 A | 5/1973 | Louckes et al | 475/150 |
| 4,650,029 A | 3/1987 | Foote et al. | 180/248 |
| 4,995,633 A * | 2/1991 | Santo | 280/124.146 |
| 4,995,853 A | 2/1991 | Schwarzler et al. | 464/144 |
| 5,004,064 A | 4/1991 | Tezuka et al. | 180/197 |
| 5,016,724 A | 5/1991 | Steinhagen et al. | 180/197 |
| 5,036,939 A | 8/1991 | Johnson et al. | 180/233 |
| 5,168,955 A | 12/1992 | Naito | 180/197 |
| 5,199,325 A | 4/1993 | Reuter et al. | 74/861 |
| 5,246,245 A * | 9/1993 | Sato et al. | 280/124.138 |
| 5,407,024 A | 4/1995 | Watson et al. | 180/248 |
| 5,421,606 A * | 6/1995 | Chun | 280/124.141 |
| 5,570,755 A | 11/1996 | Fruhwirth et al. | 180/249 |
| 5,597,171 A * | 1/1997 | Lee | 280/124.142 |
| 5,688,202 A | 11/1997 | Bowen | 475/199 |
| 5,699,888 A * | 12/1997 | Showalter | 192/35 |
| 5,752,211 A | 5/1998 | Takasaki et al. | 701/69 |
| 5,839,328 A | 11/1998 | Showalter | 74/650 |
| 5,899,951 A | 5/1999 | Babbel et al. | 701/67 |
| 5,927,426 A | 7/1999 | Hall et al. | 180/249 |
| 5,984,039 A * | 11/1999 | Mayr | 180/248 |
| 6,105,702 A | 8/2000 | Showalter | 180/247 |
| 6,161,643 A | 12/2000 | Bober et al. | 180/249 |
| 6,263,995 B1 | 7/2001 | Watson et al. | 180/248 |
| 6,360,156 B1 | 3/2002 | Morganroth et al. | 701/69 |
| 6,378,677 B1 * | 4/2002 | Kuroda et al. | 192/35 |
| 6,412,618 B1 | 7/2002 | Stretch et al. | 192/35 |
| 6,449,549 B1 | 9/2002 | Dick | 701/67 |
| 6,487,486 B1 | 11/2002 | Anderson | 701/69 |
| 6,533,090 B2 | 3/2003 | Osborn | 192/48.2 |
| 6,805,217 B2 * | 10/2004 | Kinouchi et al. | 180/233 |

(Continued)

OTHER PUBLICATIONS

Gillespie, T.D., Fundamentals of Vehicle Dynamics, Society of Automotive Engineers, Inc., 1982, pp. 282-284.

*Primary Examiner*—Anne Marie M Boehler
(74) *Attorney, Agent, or Firm*—Baker & Daniels LLP

(57) ABSTRACT

A vehicle that includes front and rear wheels, an engine, an engine-driven rear angle drive for supplying torque to the rear wheels, and a power train for supplying torque from the engine to the front wheels. The power train includes driving and driven members and a coupler having an actuator switchable between on and off positions, the actuator, when off, permitting the driven member to turn freely and independently of the driving member and, when on, enabling the coupler to respond to predetermined minimum differences in rotational speed between the driving and driven members to lock these members together to rotationally couple the engine to at least one of the front wheels.

25 Claims, 2 Drawing Sheets

U.S. PATENT DOCUMENTS

| | | | |
|---|---|---|---|
| 6,817,434 B1 * | 11/2004 | Sweet | 180/245 |
| 6,945,347 B2 * | 9/2005 | Matsuno | 180/242 |
| 6,962,227 B1 * | 11/2005 | Kirkwood | 180/245 |
| 7,111,702 B2 * | 9/2006 | Perlick et al. | 180/233 |
| 2002/0142877 A1 | 10/2002 | Williams et al. | 475/198 |
| 2002/0179357 A1 | 12/2002 | Gady et al. | 180/197 |

\* cited by examiner

VEHICLE WITH OPTIMIZED ON-DEMAND FRONT DRIVE SYSTEM

FIELD

Embodiments of the invention relate to vehicles with multiple driven axles, and, certain embodiments relate particularly to all-terrain vehicles equipped for front wheel drive.

BACKGROUND SECTION

Vehicles, and particularly all-terrain vehicles (ATV's) are intended for use on a variety of different surfaces, including dry pavement, dirt, grass, slippery surfaces such as ice, and gravel. Typically, such vehicles are driven by their back wheels, but allowance is made for providing torque also to the front wheels when the back wheels slip, as, for example, when a vehicle becomes mired in mud. It is not uncommon for an ATV to have a rear differential to enable it to be steered easily in a tight circle without dragging a rear wheel on the ground and doing damage to the surface upon which the vehicle is being driven, i.e., turf at a golf course. On the other hand, it is often important to be able to lock the rear differential so that both rear wheels, rather than simply the slipping or mired wheel, is driven. Differential gearing also can be employed at the front of a vehicle, as when the front wheel drive is continuously engaged. Here, either the front differential, the rear differential, or both, may be "locked up" so that torque is delivered by the engine to each wheel. Front wheel drive vehicles in which both front wheels are continuously driven, as when a front differential is locked, commonly are difficult to steer and accordingly are unpleasant to drive.

Double acting overrunning clutches have been employed in certain operations to allow a driven member to rotate faster than a drive member; see, for example, U.S. Pat. No. 3,194,369. Roller clutches have been used in transfer cases of certain four wheel drive vehicles to engage the front axle when the rear wheels begin to spin; see U.S. Pat. No. 3,295,625. U.S. Pat. No. 5,036,939 describes a vehicle having a pair of steerable wheels, each steerable wheel including a hub having a double acting overrunning clutch. Here, the front axle is preferably geared so that the front wheels are driven by the ground at a rotational speed approximately 10-30% faster than the front axle such that when the rotational speed of the front axle catches up to the ground-driven rotational speed of the front wheels (as when the rear wheels are spinning), the clutch will transmit torque from the front axles to the front wheels.

It would be desirable to provide a four wheel vehicle such as an ATV that would automatically transfer torque to one or both front wheels in response to slippage of either or both of the rear wheels, and would accomplish this purpose in a manner that would continue to provide torque to the front wheels only when needed.

BRIEF SUMMARY OF THE INVENTION

One embodiment of the present invention provides a vehicle having front and rear wheels, an engine, and a power train for supplying torque to the front and rear wheels. The power train includes a front wheel drive portion comprising a driving member and a driven member, and includes a clutch pack having an actuator that is switchable between on and off positions. When in the off position, the actuator permits the driven member to turn freely and independently of the driving member. When on, the actuator enables the clutch pack to respond to predetermined minimum differences in rotational speed between the driving and driven members to lock these members together to rotationally couple the engine to at least one of the front wheels. Desirably, as long as torque continues to be delivered to the front wheels, the clutch pack continues to rotationally couple the engine to at least one front wheel. However, when torque is no longer needed to be supplied to the front wheels, as when the average speed of the back wheels and the front wheels is essentially the same, the actuator returns to its off position.

DETAILED DESCRIPTION OF THE INVENTION

Several embodiments of the invention relate to a vehicle utilizing one and preferably several clutch packs, each having an actuator that can be switched between on and off positions. Clutch packs of the multi-plate design are known to the art, and need not be described in detail. One such clutch pack is made by FCC (Thailand) Co., Ltd. These clutch packs have the capacity of locking together two rotating members, of which one may be called the driving member and the other the driven member. The driving member, for example, may be a ring gear in the front gear case of an ATV, and the driven member may be the shaft that is attached to the wheel. Clutch packs useful in practicing embodiments of the invention have an additional feature in that, before they become operational to lock driving and driven members together, they must be activated. These clutch packs have an actuator that can be switched between on and off positions. When an actuator is in an on position, the clutch pack is activated so that it becomes responsive to certain sensed differences in rotational speed between the driven and driving members, and locks the members together in response to sensing such speed differential. Moreover, once one of these clutch pack locks together the driving and driven members, such members continue to be rotationally locked together for as long as torque continues to be transmitted from the driving member to the driven member.

The clutch packs employed in the invention may be operated electrically, mechanically or hydraulically, but preferably the actuators are activated electronically and automatically. In one embodiment, an ATV is provided with a rider-operated switch enabling the rider to choose between two-wheel drive and four-wheel drive. Selection by the rider of two wheel drive disables the clutch packs from becoming activated, e.g., by maintaining the actuators in their off positions or by simply cutting electric power to the actuators.

Figure 1:
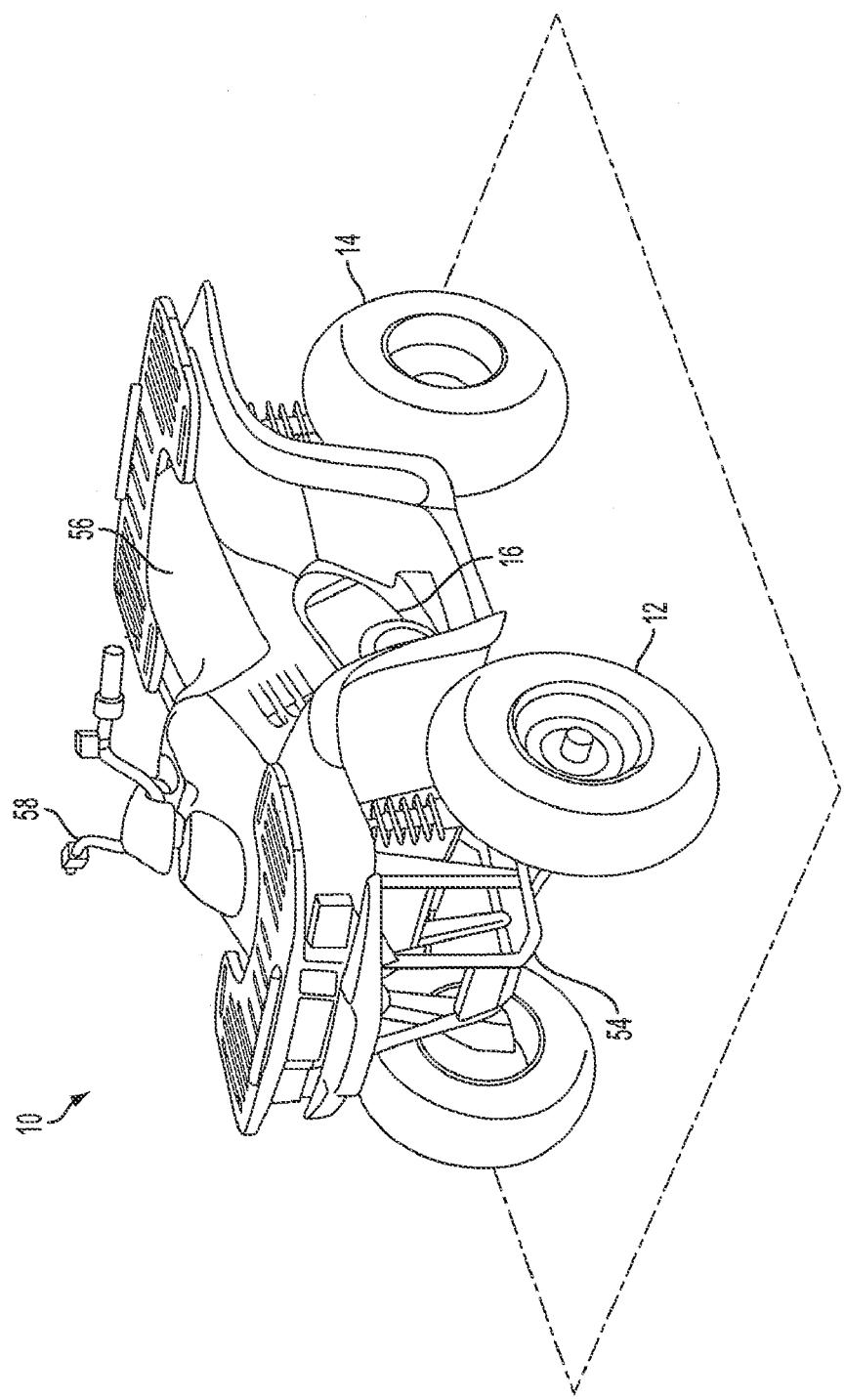
FIG. 1 is a perspective view of a vehicle of an embodiment of the invention.

FIG. 1 is a perspective view of a vehicle 10 in accordance with an exemplary embodiment of the present invention. Vehicle 10 of FIG. 1 may be generally referred to as an ATV. Vehicle 10 comprises a frame 54 carrying a straddle type seat 56. In the embodiment of FIG. 1, straddle type seat 56 is sufficiently narrow to be straddled by a vehicle rider. In alternate embodiments, the seat may be of the bucket type, and a second seat for a passenger may be positioned on the side of or to the rear of the operator seat. In the embodiment of FIG. 1, vehicle 100 has front wheels 12, a rear wheels 14, and a handlebar 58 that may be used for steering vehicle 10.

In the embodiment of FIG. 1, front wheels 12 are each coupled to frame 54 by a front suspension and rear wheels 14 are coupled to frame 54 by a rear suspension. Vehicle 10 also includes an engine 16 that is carried by frame 54. Engine 16 is preferably coupled to at least some wheels of vehicle 10 via a power train for propelling vehicle 10. Engine 16 may be used to power each rear wheel, and in some cases also each front wheel.

Figure 2:
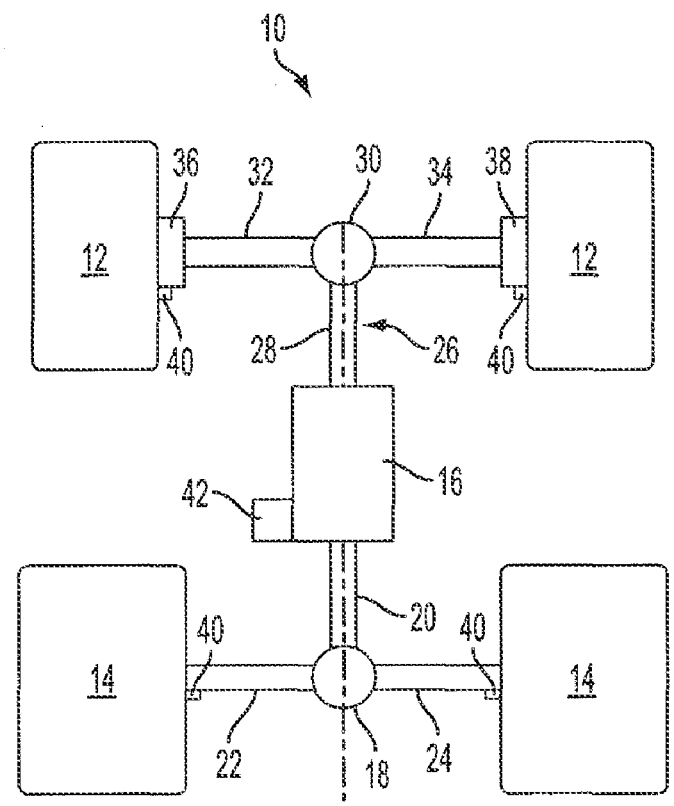
FIG. 2 is a schematic plan view of the drive train of a vehicle of an embodiment of the invention.

A vehicle of an embodiment of the invention is shown schematically as 10 in FIG. 2, the vehicle having front wheels 12, rear wheels 14, and an engine 16 including a transmission. A power train portion for delivering torque to the rear wheels comprises an engine-driven prop shaft 20 that delivers torque to a rear angle drive 18, that may be a differential, and that powers rear axles 22, 24. Extending forwardly from the engine is a front drive system designated generally as 26 and including a drive shaft 28 and a ring and pinion gear 30 for delivering torque from the drive shaft to the front axle halves 32, 34.

In one embodiment, clutch packs 36, 38 are located at the front wheel hubs and serve to transmit torque from the front half axles 32, 34 to the respective hubs. Torque from the engine 16 is delivered forwardly through drive shaft 28 and is distributed to the front axle halves by the angle drive 30. Prop shaft 20 delivers torque rearwardly to the rear axle angle drive 18, which then supplies torque to the rear half axles 22, 24 and thence to the rear wheels 14. In this embodiment, speed sensors 40 are positioned to measure the rotational speed of each wheel. Through the use of a controller 42, the speed of the front wheels is averaged and is compared with the average of the rotational speed of the rear wheels. If differences of more than a set percentage, such as 1 to 2%, are sensed between the average speeds of the front and rear wheels (indicating, for example, that one of the rear wheels had begun to slip), the controller momentarily switches on the actuators of the clutch packs 36, 38.

Once the clutch packs have thus been activated, each clutch pack will lock its respective front half axle to a wheel hub if and only if the rotational speed of the axle and the rotational speed of the hub differ. With some clutch packs, this is accomplished through the use of a ball ramp structure. That is, in the event of a speed difference, a ball and ramp carried by the driving and driven members (or vice versa) rotate with respect to each other, causing the ball to ride up the ramp to lock up the clutch pack. When this has occurred, the torque transferred through the clutch pack from the driving member to the driven member will maintain this condition. If there is no torque transmission, however, a return spring or the like in the clutch pack will reset the positions of the ball and ramp. As to ball and ramp structures, reference is made to U.S. Pat. No. 5,036,939, the teachings of which are incorporated herein by reference.

Periodically—that is, every second or so—the controller will switch off the actuator of each clutch pack. As long as torque continues to be supplied to the front wheels by the front half axles, the clutch packs will remain in their locked position. The controller continues to monitor wheel speed. If the sensed average rotational speeds of the front and rear tires continue to differ by more than a few percent, the clutch packs are reactivated, and the cycle begins again. However, at such time as no further speed difference is detected (for example, when the rear wheels have stopped slipping), the actuators remain in their switched off condition and the front wheels are permitted to rotate freely on the front half axles. The slight amount of leeway or play (e.g., 1-2%, as indicated above) between the average speeds of the front and rear tires enable the front wheels to travel at different speeds, as, for example, when a turn is made, without activation of the clutch packs.

The speed sensors 40, which sense the rotational speed of the respective wheels, desirably are mounted at or near the hubs of the wheels, but may, in fact, be mounted elsewhere in the drive system. For example, in the absence of a rear differential, the average rotational speed of the rear wheels may be assumed to be a linear function of the rotational speed of the drive shaft 20, and thus only the rotational speed of the drive shaft need be measured. It will also be understood that although the clutch packs 36, 38 are activated simultaneously by the controller 42, the clutch packs 36, 38 may act independently of each other, depending on relative speed differences.

Although the invention has thus far been described primarily in connection with clutch packs that serve to connect the front half axles with the wheel hubs, it should be understood that the clutch packs may be placed elsewhere in the second drive train leading from the engine to the front wheels. For example, the clutch packs may be placed between the ring and pinion gear 30 and each of the half axles 32, 34. In another embodiment, only a single clutch pack is employed, that clutch pack being employed between the engine 16 and the drive shaft 28, or between the drive shaft 28 and the pinion gear 30.

In FIG. 2, the rear prop shaft may be joined to the rear half axles by a rear differential 18, in which case it is desired that this differential be capable of being locked so as to cause the engine to turn both rear wheels at the same time regardless of slippage. Lockable rear wheel differentials are shown, for example, in U.S. Pat. Nos. 4,995,853 and 3,732,752, the teachings of which are incorporated herein by reference.

Figure 3:
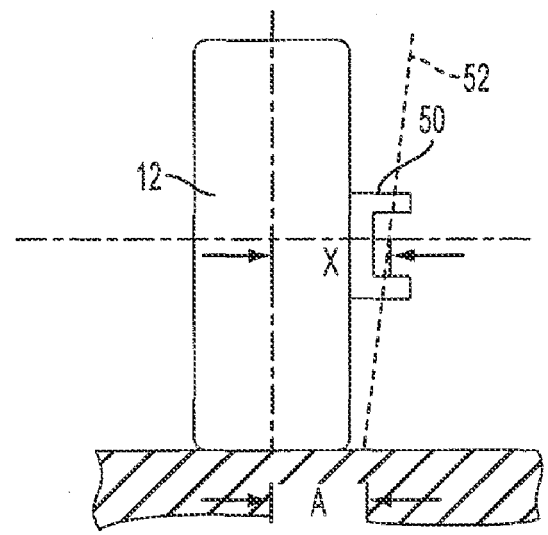
FIG. 3 is a schematic front view of a right front wheel of a vehicle of an embodiment of the invention in relation to a steer rotation or "kingpin" axis.

Once the front clutch packs have been activated and deliver torque to the front wheels, an ATV of the invention may become noticeably harder to steer. For each front wheel, a steer angle is achieved by rotation of the wheel about a steer rotation axis, which commonly is referred to as the "kingpin" axis even though the axis may be established by ball joints or the like. FIG. 3 shows a front wheel 12 together with a steering bracket 50. The kingpin axis is shown at 52, and the spacing between the intersection of the kingpin axis with the ground and the center line of the wheel is designated A in FIG. 3 and is commonly referred to as the offset at the ground, or "scrub" of the wheel. The distance X measured along the axis of rotation of the tire between the kingpin axis and the center of the tire is commonly called the kingpin offset, and desirably is not greater than about six inches. The lateral angle between the kingpin axis and the vertical (the "kingpin inclination angle") desirably is minimized to afford minimal steering effort in conditions wherein the torque provided to one wheel does not match the torque provided to the other. By using a relatively small offset at the ground, a certain "feel of the road" is accomplished and static steering efforts are reduced by allowing the tire to roll around an arc when it is turned. By making the kingpin offset at ground as small as possible, the steering effort required to steer an ATV is reduced. Reference is made to Gillespie, T. D., Fundamentals of Vehicle Dynamics, Society of Automotive Engineers, Inc., 1982, pp. 282-284, the teachings of which also are incorporated herein by reference.

The clutch packs employed in the present invention work in either direction. That is, in addition to locking the front wheels to the front half drive axles when the rear wheels are spinning, a similar lock up may occur when the rear wheels are being braked such that the average rotational speed of the rear wheels is substantially less than the average rotational speed of the front wheels. As this occurs, lock up of the front wheels will again take place, and the front wheels are employed to aid in the braking effort. This may occur, for example, when the vehicle uses the engine to help brake and one or both of the rear wheels begin to skid during the braking operation.

Although the vehicle of the invention has been described thus far as having a driven front drive shaft 28 that continuously delivers torque to the front half axles 32, 34, it should be understood that the front drive system 26 may include a clutch pack that enables the front axles to be rotationally disconnected or unlocked from the engine to enable the vehicle to be switched between two wheel (rear wheel) drive and four wheel drive. Of course, as mentioned earlier, when two wheel (rear wheel) drive is selected, the clutch packs are not activated, regardless of wheel slippage.

While preferred embodiments of the present invention have been described, it should be understood that various changes, adaptations and modifications may be made therein without departing from the spirit of the invention and the scope of the appended claims.

What is claimed is:

1. A four wheel drive vehicle having front and rear wheels, an engine, a power train for supplying torque to the front and rear wheels, the power train having a driving member and a driven member between at least one of the engine and the front wheels, and the engine and the rear wheels, a clutch pack joining the driving and driven members and having an actuator switchable between on and off positions, the actuator, when off, permitting the driven member to turn freely and independently of the driving member and, when on, enabling the clutch pack to respond to predetermined minimum differences in rotational speed between the driving and driven members to lock these members together to deliver torque to the driven member, and including speed sensors sensing a function of the rotational speeds of the rear wheels and the front wheels and a controller for switching the actuator on in response to a sensed predetermined absolute difference between rotational speeds of the front and rear wheels, wherein the clutch pack, when locked, remains locked for as long as torque is continuously transferred from the driving member to the driven member and wherein the controller periodically and momentarily switches the actuator off to enable the clutch pack to unlock if torque is not being transferred to the driven member by the driving member.

2. The vehicle of claim 1 wherein the power train includes a front differential, a rear differential, or both a front and rear differential.

3. The vehicle of claim 1 wherein the power train includes a differential between a power train portion delivering torque to the front wheels and a power train portion delivering torque to the rear wheels.

4. The vehicle of claim 1 wherein each front wheel has a steer rotation axis and a kingpin offset not greater than about six inches.

5. The vehicle of claim 1 wherein the second power train includes a drive shaft driven by the engine, and wherein the speed function is the rotational speed of the shaft.

6. The vehicle of claim 5 including a prop shaft for transmitting torque to the rear differential, and wherein the function of the rotational speed of the rear wheels is the rotational speed of the prop shaft.

7. The vehicle of claim 1 including a prop shaft for transmitting torque to the rear differential, and wherein the function of the rotational speed of the rear wheels is the rotational speed of the prop shaft.

8. The vehicle of claim 1 wherein the power train includes two driving members and two respective driven members, each driving member being a front axle, each driven member being a front wheel, and including clutch packs operatively coupling respective front axles and front wheels.

9. The vehicle of claim 1 including front and rear axles and wherein each front axle includes a driving member, a driven member, and a clutch pack operatively coupling the driving and driven members to transfer torque from the driving member to the driven member.

10. The vehicle of claim 1 wherein the clutch pack, when enabled, locks the driven member and the driving member together only if the rotational speed of the driven member and the rotational speed of the driving member differ.

11. A vehicle having front and rear wheels, an engine, a selector switch operable by a rider, an engine-driven rear angle drive for supplying torque to the rear wheels, and front axles driven by the engine, the front axles being joined to the front wheels by respective activatable clutch packs, each clutch pack having an actuator that can be switched on and off by operation of the selector switch, the actuator, when off, permitting the front wheels to turn freely and independently of the front axles and, when on, enabling the clutch pack to respond to predetermined minimum absolute differences in rotational speed between the front wheels and the front axles to lock the front wheels and axles together, wherein the clutch packs, when locked, remain locked for as long as torque is continuously transferred from the front axles to the front wheels, and wherein the controller switches the actuator on momentarily and then off to enable the clutch packs to return to their unlocked positions if torque is not transferred to the front wheels by the front axles.

12. The vehicle of claim 11 wherein the rear angle drive comprises a differential that can be locked and unlocked.

13. The vehicle of claim 11 including speed sensors sensing a function of the rotational speeds of the rear wheels and the front wheels and a controller for switching the actuator on in response to a sensed predetermined difference between rotational speeds of the front and rear wheels.

14. The vehicle of claim 13 including a power train having a drive shaft driven by the engine, and wherein the speed function is the rotational speed of the shaft.

15. The vehicle of claim 13 including a prop shaft for transmitting torque to the differential, and wherein the function of the rotational speed of the rear wheels is the rotational speed of the prop shaft.

16. The vehicle of claim 11 wherein, for a given engine speed and without wheel slippage on the ground, the front tire rotational speed driven by the ground is faster than the front axle rotational speed by a predetermined rotational speed difference.

17. The vehicle of claim 16 wherein the rotational speed difference between the front tires and the front axles is in the range of about 1% to about 3%.

18. The vehicle of claim 11 including a power train for transmitting torque from the engine to the front axles.

19. The vehicle of claim 18 wherein the power train includes a differential.

20. The vehicle of claim 19 wherein the differential can be locked and unlocked.

21. The vehicle of claim 11 wherein each front wheel has a steer rotation axis and having a kingpin offset not greater than about six inches.

22. The vehicle of claim 11 wherein each clutch pack, when enabled, locks the front wheel and the front axle together only if the rotational speed of the front wheel and the rotational speed of the front axle differ.

23. A four wheel drive vehicle having front and rear wheels, an engine, a power train for supplying torque to the front and rear wheels, the power train having a driving member and a driven member between at least one of the engine and the front wheels, and the engine and the rear wheels, a clutch pack joining the driving and driven members and having an actuator switchable between on and off positions, the actuator, when off, permitting the driven member to turn freely and independently of the driving member and, when on, enabling the clutch pack to respond to predetermined minimum differences in rotational speed between the driving and driven members to lock these members together to deliver torque to the driven member, wherein the clutch pack, when locked, remains locked for as long as torque is continuously transferred from the driving member to the driven member, wherein the controller periodically and momentarily switches the actuator off to enable the clutch pack to unlock if torque is not being transferred to the driven member by the driving member.

24. A four wheel drive vehicle having front and rear wheels, an engine, a power train for supplying torque to the front and rear wheels, the power train having a driving member and a driven member between at least one of the engine and the front wheels, and the engine and the rear wheels, a clutch pack joining the driving and driven members and having an actuator switchable between on and off positions, the actuator, when off, permitting the driven member to turn freely and independently of the driving member and, when on, enabling the clutch pack to respond to predetermined minimum differences in rotational speed between the driving and driven members to lock these members together to deliver torque to the driven member wherein, in the absence of wheel slippage, for a given engine speed, the front tire rotational speed as driven by the ground is faster than the front axle rotational speed by a predetermined rotational speed difference.

25. The vehicle of claim 24 wherein the rotational speed difference between the front tires and the front axles is in the range of about 1% to about 5%.

* * * * *